(12) United States Patent
Briese et al.

(10) Patent No.: US 11,845,687 B2
(45) Date of Patent: Dec. 19, 2023

(54) IGU COOLING ASSEMBLY AND METHOD OF OPERATION

(71) Applicant: GED INTEGRATED SOLUTIONS, INC., Glenwillow, OH (US)

(72) Inventors: William A. Briese, Hinckley, OH (US); Jason A. Rody, Ravenna, OH (US); John Grismer, Cuyahoga Falls, OH (US)

(73) Assignee: GED Integrated Solutions, Inc., Glenwillow, OH (US)

( * ) Notice: Subject to any disclaimer, the term of this patent is extended or adjusted under 35 U.S.C. 154(b) by 66 days.

(21) Appl. No.: 17/354,627

(22) Filed: Jun. 22, 2021

(65) Prior Publication Data

US 2021/0403364 A1 Dec. 30, 2021

Related U.S. Application Data

(60) Provisional application No. 63/043,288, filed on Jun. 24, 2020.

(51) Int. Cl.
```
C03B 32/00    (2006.01)
E06B 3/673    (2006.01)
B65G 49/06    (2006.01)
B65G 15/30    (2006.01)
B65G 39/18    (2006.01)
```
(Continued)

(52) U.S. Cl.
CPC .............. *C03B 32/00* (2013.01); *B65G 15/30* (2013.01); *B65G 39/18* (2013.01); *B65G 49/067* (2013.01); *E06B 3/67365* (2013.01); *B65G 2201/022* (2013.01); *C03B 35/16* (2013.01); *C03C 27/06* (2013.01); *E06B 3/66352* (2013.01); *E06B 3/6736* (2013.01); *E06B 3/67317* (2013.01)

(58) Field of Classification Search
None
See application file for complete search history.

(56) References Cited

U.S. PATENT DOCUMENTS

| | | | | | |
|---|---|---|---|---|---|
| 6,068,720 A | * | 5/2000 | McHugh | ............. | E06B 3/67365 141/4 |
| 6,318,111 B1 | * | 11/2001 | Murakami | ............... | A23G 7/02 62/380 |

(Continued)

FOREIGN PATENT DOCUMENTS

JP H07231160 A * 8/1995

*Primary Examiner* — William R Harp
(74) *Attorney, Agent, or Firm* — Watts Law LLC; Samantha R. Smart, Esq.

(57) ABSTRACT

An insulating glass unit cooling assembly and method of cooling an insulating glass unit is provided. The cooling assembly includes a cooling unit that directs air at insulating glass units and a conveyor that transports insulating glass units along a path of travel defining an axis of travel for the insulating glass units. The conveyor has a conveyor planar surface that supports a corresponding planar glass surface of the insulating glass units as the insulating glass units are conveyed along the axis of travel such that the planar surface of the insulating glass units are substantially horizontal and substantially parallel to the conveyor planar surface. The air from the cooling unit is directed in a path substantially parallel with the conveyor planar surface and the planar glass surface of the insulating glass units as the insulating glass units travel along the conveyor.

20 Claims, 12 Drawing Sheets

(51) Int. Cl.
    *C03B 35/16*     (2006.01)
    *E06B 3/663*     (2006.01)
    *C03C 27/06*     (2006.01)

(56) References Cited

U.S. PATENT DOCUMENTS

| | | |
|---|---|---|
| 7,048,964 B2 | 5/2006 | McGlinchy et al. |
| 8,512,501 B2 | 8/2013 | McGlinchy |
| 10,640,412 B2 * | 5/2020 | Sønderkaer ............ E06B 3/6733 |
| 2013/0333842 A1 | 12/2013 | McGlinchy |
| 2017/0074030 A1 | 3/2017 | Briese et al. |
| 2018/0339307 A1 | 11/2018 | Grismer |

* cited by examiner

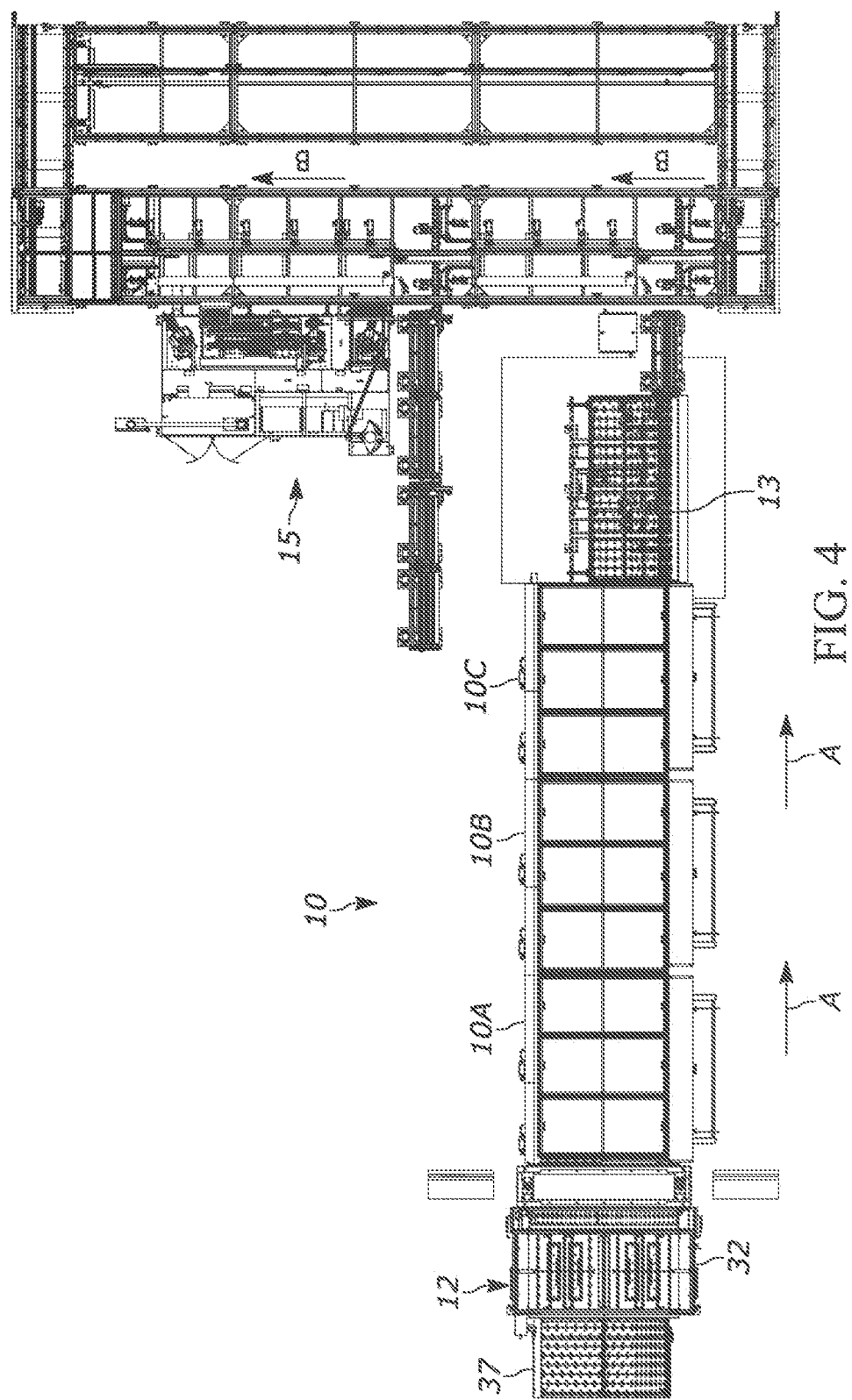

IGU COOLING ASSEMBLY AND METHOD OF OPERATION

CROSS REFERENCES TO RELATED APPLICATIONS

The following application claims priority under 35 U.S.C. § 119(e) to U.S. Provisional Patent Application Ser. No. 63/043,288 filed Jun. 24, 2020 entitled IGU COOLING ASSEMBLY AND METHOD OF OPERATION. The above-identified application is incorporated herein by reference in its entirety for all purposes.

TECHNICAL FIELD

The present disclosure relates to an insulating glass unit (IGU) cooling assembly and method of operation, and more particularly, a cooling assembly and method of operation that provides rapid cooling to an IGU after exiting a heating and pressing oven, such that the IGU reaches a target temperature allowing a change in the orientation of the IGU from a horizontal position to a vertical position, reducing throughput times and work-in-process.

BACKGROUND

Insulating glass units (IGUs) are useful in maintaining temperature control in building interiors. Construction of IGUs generally begins with coiled steel or aluminum which is uncoiled in a stock supply station. An indexing mechanism coupled to the sheet stock coils is used to index and select a sheet stock coil for uncoiling and processing. The uncoiled aluminum or steel is then punched or notched to create any necessary indentations that will allow the material to eventually be folded into the shape of a window frame. In the roll form step, the steel or aluminum is three dimensionally shaped to form a hollow rectangular tube or "U" shaped channel. Generally, a desiccant material is placed within the rectangular tube or channel, and some provisions are made for the desiccant to come into fluid communication with or otherwise affect the interior space of the insulated glass unit. The elongated tube or channel is notched and assembled to allow the channel to be formed into a rectangular frame. Generally, a sealant is applied to the outer three sides of the spacer frame in order to bond a pair of glass panes to either opposite side of the spacer frame. Existing heated sealants include hot melts and dual seal equivalents (DSE). The pair of glass panes or lites are positioned on the spacer frame to form a pre-pressed insulating glass unit. Generally, the pre-pressed insulating glass unit is passed through an IGU oven to melt or activate the sealant. The pre-pressed insulating glass unit is then passed through a press that applies pressure to the glass and sealant and compresses the IGU to a selected pressed unit thickness.

Typically, manufacturers of insulating glass units reduce the speed at which the insulating glass units pass through the IGU oven to the speed required to heat the sealant of a "worst case" IGU. This slower speed increases the dosage of exposure. In addition to the line speed sacrificed, many of the IGU's are overheated at the surface, resulting in longer required cooling times, and more work in the process. Further discussion of processing sealant of an IGU can be found in U.S. Pat. No. 8,512,501 and U.S. patent application publication number US 2013/0333842, both of which are incorporated herein by reference in their entireties for all purposes.

The IGU proceeds to an IGU staging station that is necessary for the IGU after leaving the oven to drop to a temperature near or at ambient before proceeding to an IGU sealing assembly station. Once the IGU enters the sealing assembly station, sealant is extended continuously about the spacer frame periphery and its opposite sides so that the space within the IGUs is hermetic. The sealant provides a barrier between atmospheric air and the IGU interior, which blocks entry of atmospheric water vapor.

Conventionally, sealant is manually applied around a majority of the spacer frame periphery, while leaving a small opening formed through the spacer frame uncovered, or free from sealant. The atmospheric air is evacuated, and an inert gas is inserted into the space within the IGU. A rivet or screw is inserted into the opening, and additional sealant is then applied over the uncovered area. Particulate desiccant is typically deposited inside the spacer frame and communicates with air trapped in the IGU interior to remove the entrapped airborne water vapor, and as such, precludes condensation within the unit. Thus, after the water vapor entrapped in the IGU is removed, internal condensation only occurs if the unit fails. The sealant over the uncovered area is typically where IGUs have failed because atmospheric water vapor infiltrated the sealant barrier, such as when the new or second pass sealant over the uncovered area is not hot enough to create a bond with the previously applied sealant, the new sealant is applied unevenly, and/or the like. Additionally, the sealant may be applied unevenly when edges of the glass lites are not co-planar, or otherwise uneven.

Such sealant issues are discussed in U.S. Pat. Pub. No. 2017/0071030 to Briese et al., which is assigned to the assignee of the present disclosure and is incorporated herein by reference in its entirety for all purposes. Sealant dispensing, utilizing a sealant metering pump, is discussed in further detail in U.S. Pat. No. 7,048,964, to McGlinchy et al., which is assigned to the assignee of the present disclosure and is incorporated herein by reference in its entirety for all purposes. More modern sealing assembly stations invented by the assignee of the present disclosure is described in U.S. Pat. Publication No. 2018/0339307 entitled Insulating Glass Unit Final Sealing Assembly and Method to John Grismer et al. U.S. Pat. Publication No. 2018/0339307 is incorporated herein by reference in its entirety for all purposes.

SUMMARY

One aspect of the present disclosure includes an insulating glass unit cooling assembly. The cooling assembly includes a cooling unit that directs air at insulating glass units and a conveyor that transports insulating glass units along a path of travel defining an axis of travel for the insulating glass units. The conveyor has a conveyor planar surface that supports a corresponding planar glass surface of the insulating glass units as the insulating glass units are conveyed along the axis of travel such that the planar surface of the insulating glass units is substantially horizontal and substantially parallel to the conveyor planar surface. The air from the cooling unit is directed in a path substantially parallel with the conveyor planar surface and the planar glass surface of the insulating glass units as the insulating glass units travel along the conveyor.

Another aspect of the present disclosure includes an insulating glass unit cooling assembly system comprising a cooling unit that directs air at insulating glass units; a conveyor that transports insulating glass units along a path of travel defining an axis of travel for the insulating glass units. The conveyer has a planar surface supporting the corresponding planar surface of the at least one or more glass lites of the insulating glass units during use. The conveyor further has a horizontal and a vertical axis of travel and the conveyor is in fluid communication with the cooling unit. The cooling assembly system further comprises an upright unit wherein insulating glass units are rotated as the insulating glass units exit the conveyor so that a planar surface formed by at least one or more glass lites is substantially perpendicular with the planar surface of the conveyor.

Another aspect of the present disclosure includes method of cooling an insulating glass unit comprising the steps of providing a cooling assembly having at least one cooling unit. The method includes directing air at insulating glass units with the at least one cooling unit; transporting insulating glass units on a conveyor along a path of travel defining an axis of travel for the insulating glass units; providing the conveyor having a planar surface supporting a corresponding planar glass surface of the insulating glass units as the insulating glass units are conveyed along the axis of travel such that the planar surface of the insulating glass units substantially parallel to the planar surface of the conveyor; and directing the air from the at least one cooling unit in a path substantially parallel with the conveyor planar surface and the planar glass surface of the insulating glass units as the insulating glass units travel along the conveyor during operation.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which:

FIG. 4 is a plan view of several stations forming an IGU assembly line;

Figure 2:
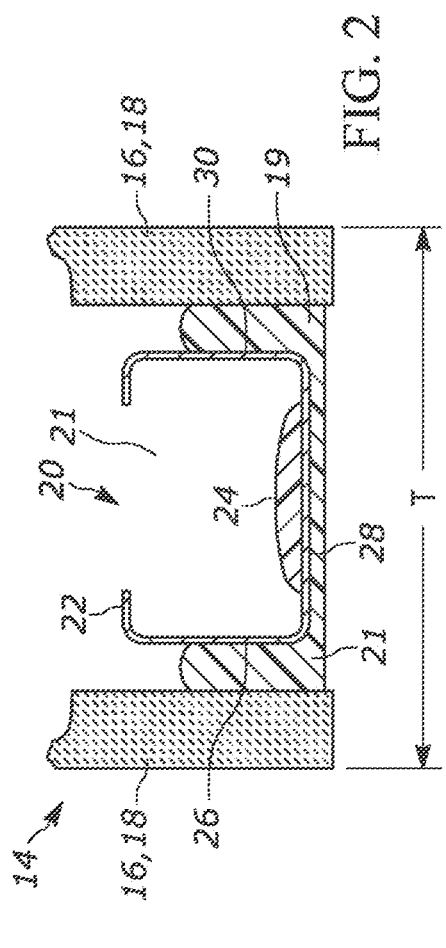
FIG. 2 is a sectional view along section lines 2-2 illustrated in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to an insulating glass unit (IGU) cooling assembly and method of operation, and more particularly, a cooling assembly and method of operation that provides rapid cooling to an IGU after exiting a heating and pressing oven, such that the IGU reaches a target temperature allowing a change in the orientation of the IGU from a horizontal position to a vertical position, reducing throughput times and work-in-process.

The present disclosure is directed to an IGU cooling assembly 10, 100 (see for example FIGS. 8 and 9) that rapidly cools heated IGU assemblies 14, 108 exiting an IGU oven/press assembly 12 before entering an upright table station 13. From the upright table station 13, the IGUs 14, 108 (see FIGS. 1-3) are transported to an IGU sealing assembly station 15 (see FIG. 4). The flow of the IGUs is illustrated by the direction of arrows A in FIG. 4 from the oven/press assembly 12 through cooling stations 10A, 10B, and 10C, to the upright station 13. Upon reaching the upright station 13, the IGUs 14, 108 are rotated ninety degrees (90°) so that the planar surface formed by glass lites 16, 18 is substantially perpendicular with the ground. From the upright station 13, the IGUs 14, 108 are transferred in the direction of arrows B and process by the sealing station 15 (see FIG. 4). One such IGU sealing assembly station 15 is further described and shown in in U.S. Pat. Publication No. 2018/0339307 entitled Insulating Glass Unit Final Sealing Assembly and Method by John Grismer et al. U.S. Pat. Publication No. 2018/0339307 is incorporated herein by reference in its entirety for all purposes.

Figure 3:
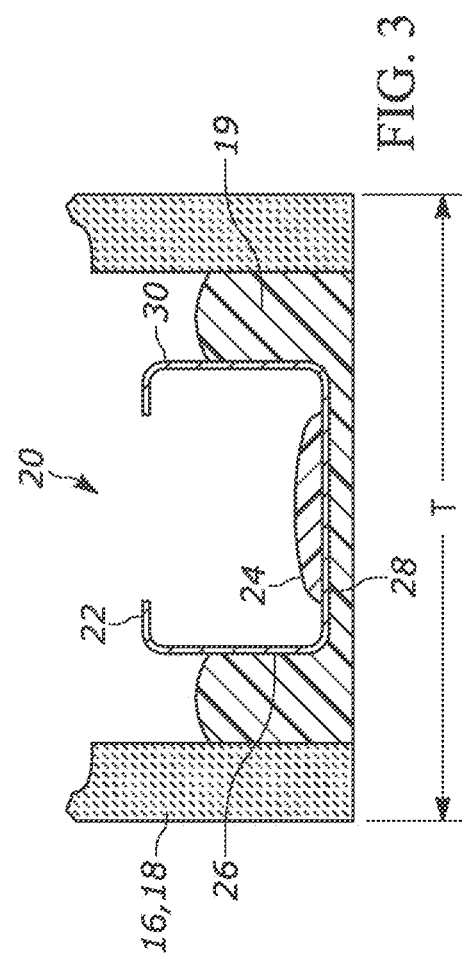
FIG. 3 is a sectional view along section lines 2-2 of an insulating glass unit prior to pressing of the sealant to achieve the insulating glass unit of FIG. 2.
Figure 1:
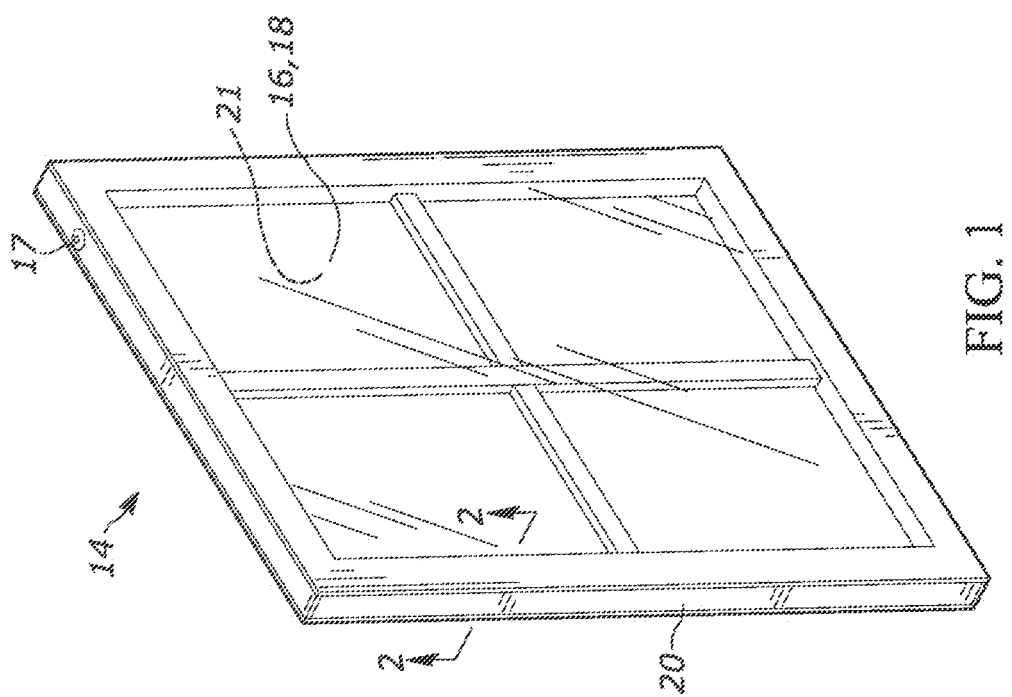
FIG. 1 is a perspective view of an insulating glass unit.

One type of insulating glass unit 14, 108 chilled or cooled by the cooling assembly 10, 100 is illustrated by FIGS. 1 and 2 as comprising a spacer assembly 20 sandwiched between glass sheets or lites 16,18. Referring to FIGS. 2 and 3, the illustrated spacer assembly 20 includes a frame structure 22, a sealant material 19 for hermetically joining the frame to glass lites 16, 18 to form a closed space 21 within the IGU 14 and a body of desiccant 24 in the space 21.

The IGU 14, 108 illustrated by FIG. 1 is in condition for final assembly into a window or door frame, not illustrated, for installation in a building. It is also contemplated that the disclosed apparatus may be used to construct an insulated window with panes bonded directly to sash elements of the window, rather than using an IGU that is constrained by the sash.

It should be readily apparent to those skilled in the art that the disclosed apparatus and method can be used with spacers other than the illustrated spacer. For example, a closed box shaped spacer, any rectangular shaped spacer, any foam composite spacer or any alternative material requiring heating can be used. It should also be apparent that the disclosed apparatus and method can be used to cool or chill insulating glass units having any shape and size.

The glass lites 16, 18 are constructed from any suitable or conventional glass. The glass lites 16, 18 may be single strength or double strength and may include low emissivity coatings. The glass lites 16, 18 on each side of the insulated glass unit need not be identical, and in many applications different types of glass lites are used on opposite sides of the IGU. The illustrated lites 16, 18 are rectangular, aligned with each other and sized so that their peripheries are disposed just outwardly of the frame 22 outer periphery.

The spacer assembly 20 functions to maintain the lites 16,18 spaced apart from each other and to produce the hermetic insulating dead air space 21 between the lites 16, 18. The frame 22 and sealant 19 co-act to provide a structure which maintains the lites 16, 18 properly assembled with the space 21 sealed from atmospheric moisture over long time periods during which the insulating glass unit 14, 108 is subjected to frequent significant thermal stresses. The desiccant body 24 serves to remove water vapor from air or other gases entrapped in the space 21 during construction of the insulating glass unit and any moisture that migrates through the sealant 19 over time.

The sealant 19 both structurally adheres the lites 16, 18 to the spacer assembly 20 and hermetically closes the space 21 against infiltration of air born water vapor from the atmosphere surrounding the IGU 14, 108. A variety of different sealants may be used to construct the IGU 14, 108. Examples include hot melt sealants, dual seal equivalents (DSE), and modified polyurethane sealants. In the illustrated embodiment, the sealant 19 is extruded onto the frame. This is typically accomplished, for example, by passing an elongated frame (prior to bending into a rectangular frame) through a sealant application station, such as that disclosed by U.S. Pat. No. 4,628,528 assigned to Glass Equipment Development, Inc. Although a hot melt sealant is disclosed, other suitable or conventional substances (singly or in combination) for sealing and structurally carrying the unit components together may be employed.

Referring to FIGS. 2 and 3, the illustrated frame 22 is constructed from a thin ribbon of metal, such as stainless steel, tin plated steel or aluminum. For example, 304 stainless steel having a thickness of 0.006-0.010 inches may be used. The ribbon is passed through forming rolls (not shown) to produce walls 26, 28, 30. In the illustrated embodiment, the desiccant 24 is attached to an inner surface of the frame wall 26. The desiccant 24 may be formed by a desiccating matrix in which a particulate desiccant is incorporated in a carrier material that is adhered to the frame. The carrier material may be silicon, hot melt, polyurethane, or other suitable material. The desiccant absorbs moisture from the surrounding atmosphere for a time after the desiccant is exposed to atmosphere. The desiccant absorbs moisture from the atmosphere within the space 21 for some time after the IGU 14, 108 is fabricated. This assures that condensation within the unit does not occur. In the illustrated embodiment, the desiccant 24 is extruded onto the frame 22.

To form an IGU 14, 108 the lites 16, 18 are placed on the spacer assembly 20. The IGU 14, 108 is heated and pressed together in the oven/press assembly 12 to bond the lites 16,18 and the spacer assembly 20 together.

Referring to FIG. 4, the illustrated oven/press assembly 12 for heating and pressing sealant 19 of an IGU 14, 108 includes an oven 32 for heating the sealant 19 of an IGU 14 and a press 34 for applying pressure to the sealant 19 and compressing the IGU 14, 108 to the desired thickness T (FIG. 2).

In the oven/press assembly 12, heating element 32 heats the primary hot-melt butyl sealant 19 prior to the pressing operation 34 to finishing overall desired thickness T. The oven/press assembly 12 consists of several infrared heater elements 32 and a rolling press 34 which compresses the sealant between the glass 16, 18 and spacer 20 and creates a perimeter seal frame 22 around the IGU 14, 108. During the oven/press 12 operations, the IGU 14, 108 is left open to ambient via a gas or vent hole opening 17, and this hole must be left open until the IGU temperature has lowered sufficiently that when sealed it will not continue to cool down and create a negative pressure inside the IGU cavity or space 21 between the lites 16 and 18. In conventional IGU 14, 108 assembly lines, this cooling area was no more than a staging area where the IGUs would sit or stage in racks until reaching the desired temperature, typically ambient (15° C. to 25° C.) was achieved.

In a conventional system, an operator receives hot IGU 14,108, typically 65° C. to 95° C., depending on the sealant requirements from the oven 32 exit conveyor 35 and racks them vertically on an IGU cart. From this point the IGUs 14, 108 are queued for cooling either by placing the cart in front of a convection fan or just waiting for cool-down to occur naturally, which can typically take 30-45 minutes. This results in a lot of work-in-process inventory for the IGUs 14, 108 as well as IGU carts, which consumes valuable floorspace for this process.

In the IGU manufacturing process 300 of the present disclosure, the progress through the manufacturing steps (see FIG. 14) transitions in a steady state fashion advantageously because of the IGU cooling assembly 10, 100, while conventional IGU manufacturing processes lacking a cooling assembly 10, 100 result in a bottle neck in manufacturing at the oven/glass press station 12 and gas fill station.

Stated another way, in a conventional IGU manufacturing process, a window typically sat stationary in a staging area to cool for 30-45 minutes. With the present cooling assembly 10, 100 the cooling step typically takes between three (3) and five (5) minutes. This increase in speed of production leads to an elimination of the bottleneck effect in the flow of IGU creation and increases output. The present disclosure advantageously accelerates the step of cooling so as to engender a consistent rate of production flow throughout each step of the IGU manufacturing process 300.

Manually handling the IGU 14, 108 when the sealant 19 is hot in a conventional system can result in contaminating (smudging) the outer glass surfaces with hot sealant and dimensional inconsistencies from the operator handling and squeezing the IGU 14, 108 during the cart loading operation. At this point, the sealant 19 is hot and has very low viscosity and green strength. Also, in conventional systems, the oven exit 35 is where the automation of the IGU 14, 108 manufacturing process historically ended.

Conventionally, cooling, gas filling, fastening and fourth ($4^{th}$) corner patching of the IGU were all done manually by an operator. Now that a system has been developed to automate the gas filling, fastening, and fourth ($4^{th}$) corner patching processes, (as described in U.S. Pat. Publication No. 2018/0339307, which is incorporated by reference) hereinafter sealing station 15, the IGU cooling process assembly and method 10, 100 provide an automated connection between the oven/press assembly 12 and the sealing station 15.

Using automation with the cooling assembly 10, 100 to provide a bridge between the oven/press assembly 12 and sealing station 15, one must first consider that the IGU 14, 108 coming out of the oven/press assembly 12 must continue to convey through the oven chamber 32 and never stop moving through at the predetermined feed rate or else the sealant 19 can overheat, burn and/or the IGU can catch fire. This is one significant consideration when designing the cooling assembly 10, 100 thus reassurance is needed in that there is sufficient out-feed capacity for the IGUs 14, 108 in the oven/press assembly 12 in the event of a downstream stoppage of production. Stated another way, there needs to be a space buffer for the hot IGU to go, while communicating back with the oven/press assembly 12 to stop the infeed conveyor 37 of any additional IGU 14, 108 into the oven chamber when a downstream stoppage (at the cooling assembly station 10, 100 upright station 13, and/or sealing station 15 is detected).

Figure 5:
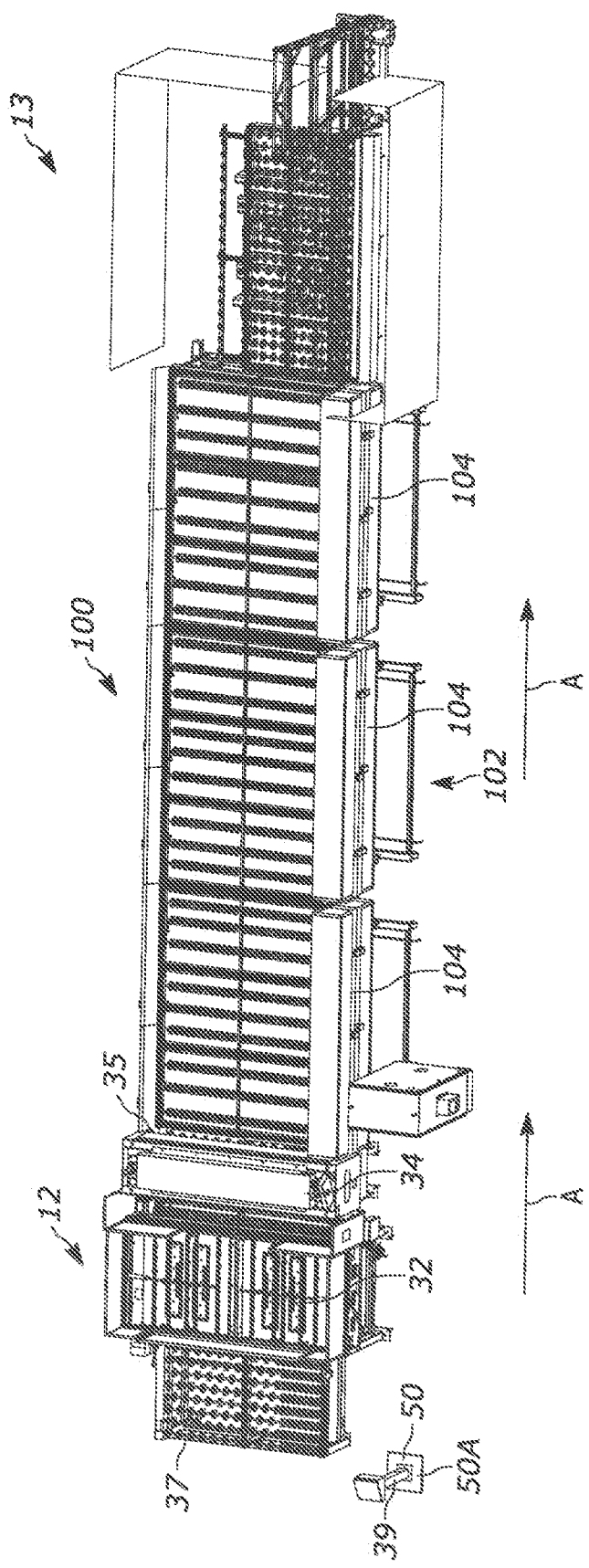
FIG. 5 is a first perspective view generally of an IGU cooling assembly constructed in accordance with one example embodiment of the present disclosure.
Figure 6:
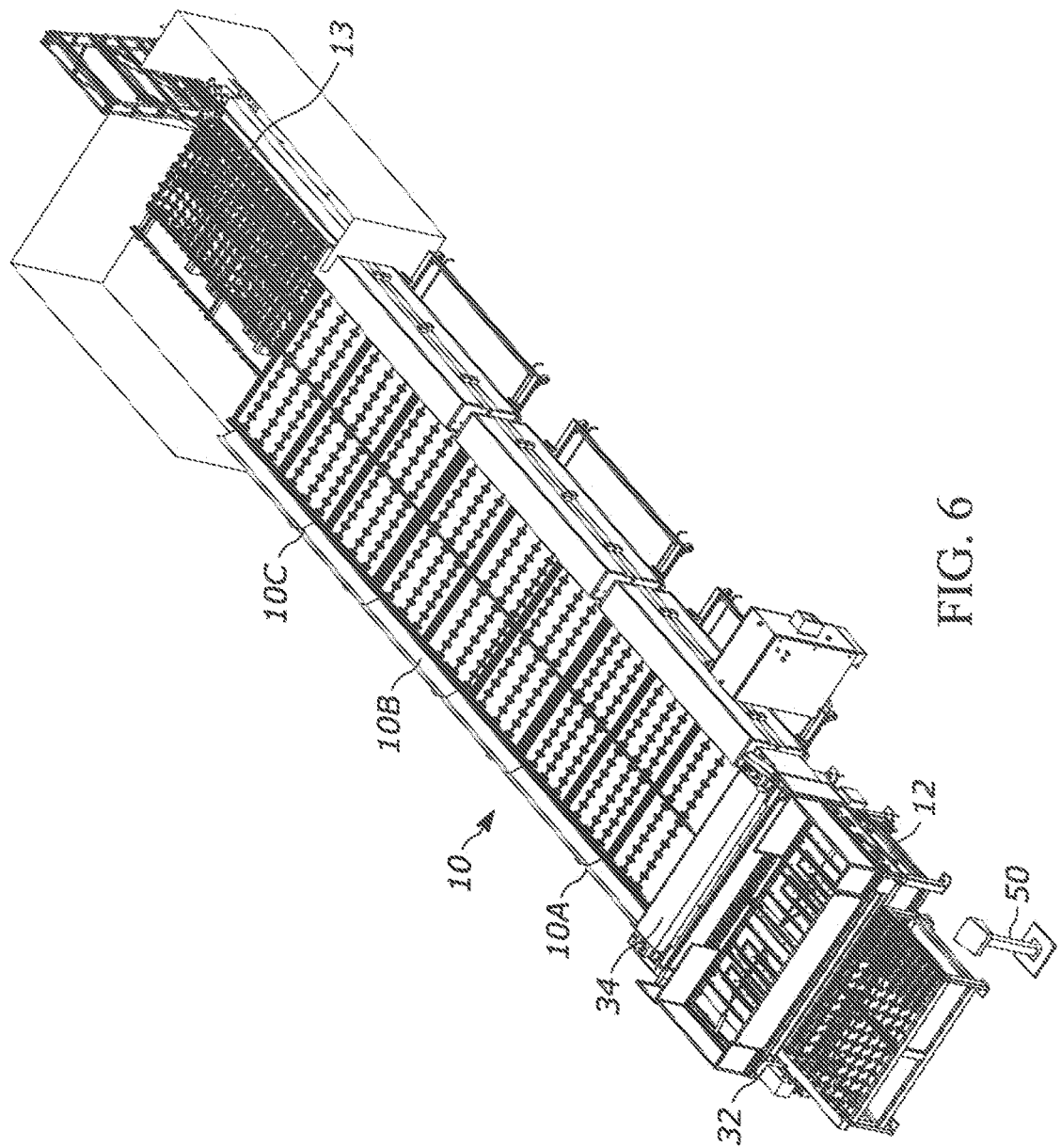
FIG. 6 is a second perspective view generally of an IGU cooling assembly of FIG. 5.
Figure 7:
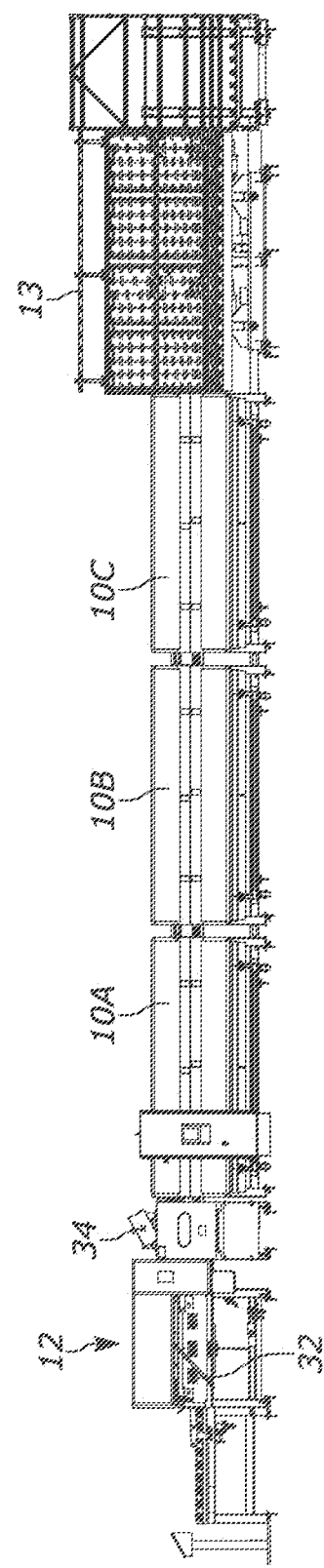
FIG. 7 is an elevated front view generally of an IGU cooling assembly constructed in accordance with one example embodiment of the present disclosure.
Figure 14:
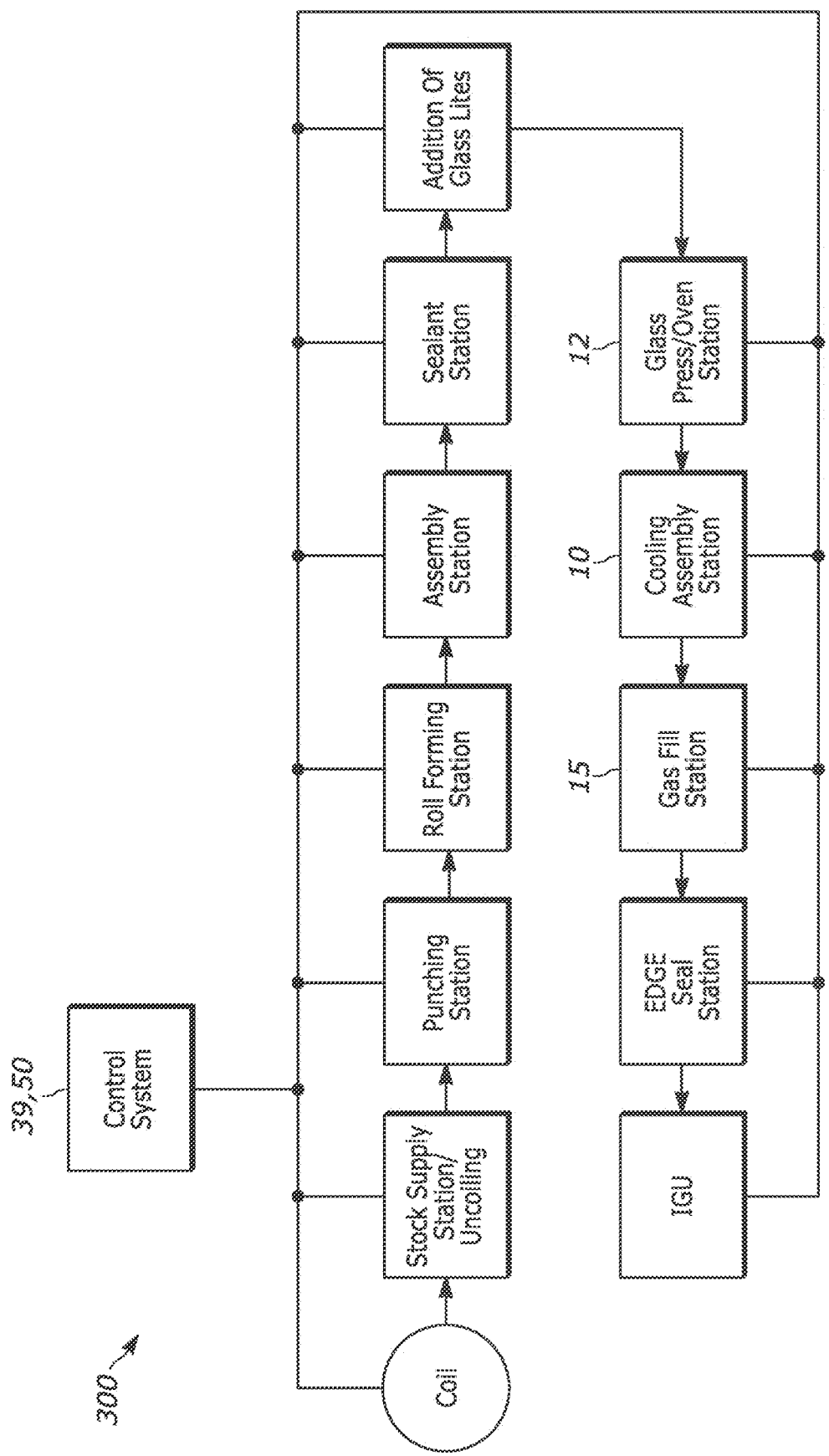
FIG. 14 is a process flow diagram illustrating the steps necessary for creation of an insulating glass unit having a cooling assembly station in accordance with one example embodiment.

To accomplish this, a control system 50 (as shown in FIGS. 5, 6, and 14) is used and communicates to the oven conveyor feed 37, oven/press assembly 12, cooling assembly 10, 100, upright station 13, and the sealing station 15 among other stations (see FIG. 14) to optimize the flow of the IGU manufacturing process 300. In one example embodiment, the control system 50 is a computer or network of computers having one or more stations 39 that quantify what is going into the oven/press assembly 12 oven chamber 32, what is already in the oven chamber 32, what is partially exited the oven chamber 32, and finally that sufficient space is available on the outfeed conveyors, cooling stations 10, 100, upright station 13, and/or sealing station 15 to accept the hot IGU.

Conventional IGU cooling systems mount box fans or air knives above and below the conveyor to cool the IGU. The air is substantially perpendicular to the surface of the glass lites and the air velocity is low, rendering conventional methods only partially effective. While this system is partially effective, it only puts the high velocity air in contact with the glass surface for a brief moment while the IGU passes by the fan.

Advantageously, the cooling assembly and method 10, 100 uses an air-curtain system 102 and orients an air curtain 104 forming an envelope of the planar sides and ends of the IGU, and is parallel with the direction of a conveyor 106 and IGU travel (see Arrows A in FIG. 5). Air curtains 104 are typically used in refrigeration systems or entry door systems to create a virtual "wall" of air that prevents hot and cold sides from transferring between each other. In one example embodiment, a suitable air curtain 104 is a product made by Berner International, model # IDC14-120. Another example embodiment, a suitable air curtain 104 is a product made by Mars, model #HV air-curtains. The specifications and data sheets of the Berner International, model # IDC14-120 and Mars, model #HV air-curtains are provided in the priority application and are part of this application as possible air curtains 104, the specifications and data sheets being incorporated herein by reference in their entireties.

Figure 12:
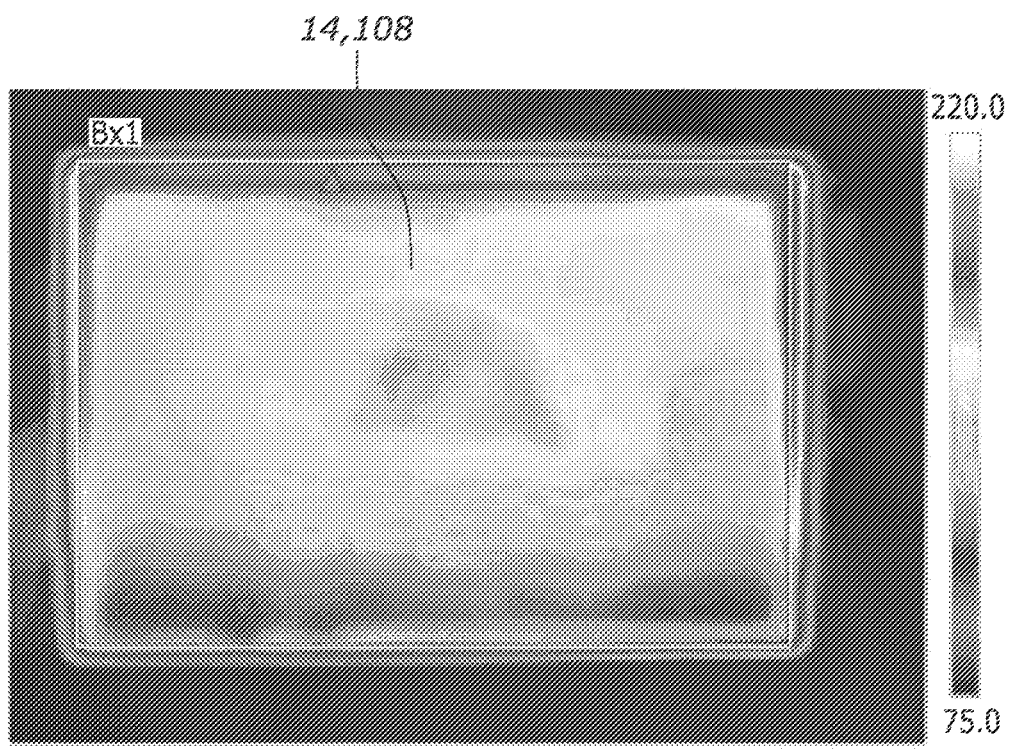
FIG. 12 is a thermal image of an IGU after exiting a press oven and experiencing heat transfer effects of an IGU cooling assembly.

The low-profile geometry of the IGU 14, 108 travelling downstream on the horizontal portion of conveyor 106 are advantageously used with an air curtain 104 and can easily receive extremely high velocity air flow between 25 and 35 miles per hour across the glass surfaces 110, 112 of the IGU 108 and generate high rates of heat transfer from the glass surface. A further improvement is made by attaching two air-curtains (104A and 104B as illustrated in the example embodiment of FIG. 8) together to use a separate air curtain source for the top 110 and bottom glass surfaces 112 of the IGU 14, 108. Because these air-curtain devices 104A and 104B are oriented parallel with the direction of IGU 14, 108 travel Ax and the fluid flow C is parallel with the planar glass surfaces 110, 112 of the IGU 14, 108, they are 100% effective in applying high velocity convection to the IGU 14, 108 for the entire time that the IGU 14, 108 is travelling across the air-curtain as illustrated in the thermal heat-transfer image of FIG. 12. This is significantly different than the conventional IGU cooling systems in which fans are used and direct the cooling flow in a direction normal or perpendicular to the planar surfaces of the IGU and perpendicular to the direction of IGU travel and thus is only fractionally as effective as the cooling system 100 of the present disclosure.

Figure 4A:
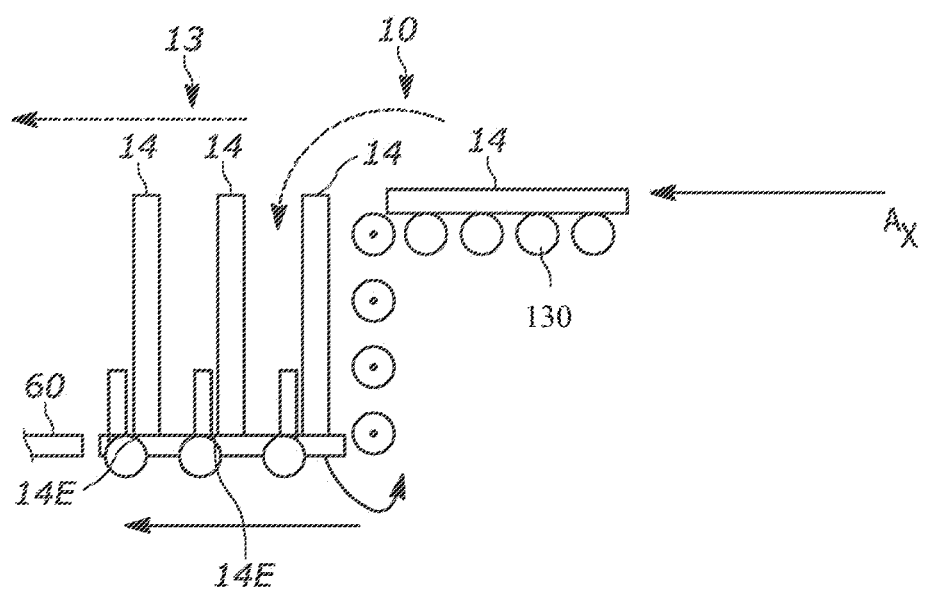
FIG. 4A is elevation view of a cooling horizonal conveyor transitioning IGUs to a vertical or upright conveyor in accordance with one example embodiment of the present disclosure.

The IGU cooling assembly 10, 100 creates a convective airflow across and planar to the IGU 14, 108 upper and lower glass surfaces 110, 112, respectively, and there is always one edge 108E of the IGU closest to the air-curtain nozzles 114. This surface is typically aligned to be parallel and close (within a few inches) of the air curtain nozzles 114, allowing this edge 108E to receive the highest rate of cooling compared with the rest of the IGU 14, 108. Stated another way, there is a temperature gradient across the IGU 14, 108, with the coolest temperature being closest to the air curtain 104 and the hottest temperature of the IGU 14, 108 being furthest away from the air-curtain. Advantageously, this temperature gradient TG accommodates the IGU 14, 108 being fed into an up-right portion of conveyor 106, which changes the orientation of the IGU from horizontal to vertical as illustrated in FIG. 4A.

Advantageously, because IGUs 14, 108 are typically racked at the up-right station 120, gas-filled and transported in a vertical or near vertical orientation, sliding or shearing of the sealant 122 is prevented. After the IGU 14, 108 is fed onto the conveyor 106, it is immediately tilted to a near vertical orientation. If this process were done to an IGU immediately after the oven, considering the butyl sealant is still hot and has very low green strength, the glass would be prone to sliding and shearing the sealant between the glass and spacer, where the glass panels would not be oriented to each other properly and the sealant 122 would become damaged.

In addition, when the IGU is vertical on the conveyor 106, the edge 108E would be riding against vertical conveyor rollers, and if there were hot sealant in this area the rollers would easily become contaminated with hot sealant. This is the same edge 108E that when horizontally oriented is closest to the air-curtain nozzles 114, and thus can reach a near room-temperature condition and present very little risk of roller contamination and minimal sealant shear.

Figure 8:
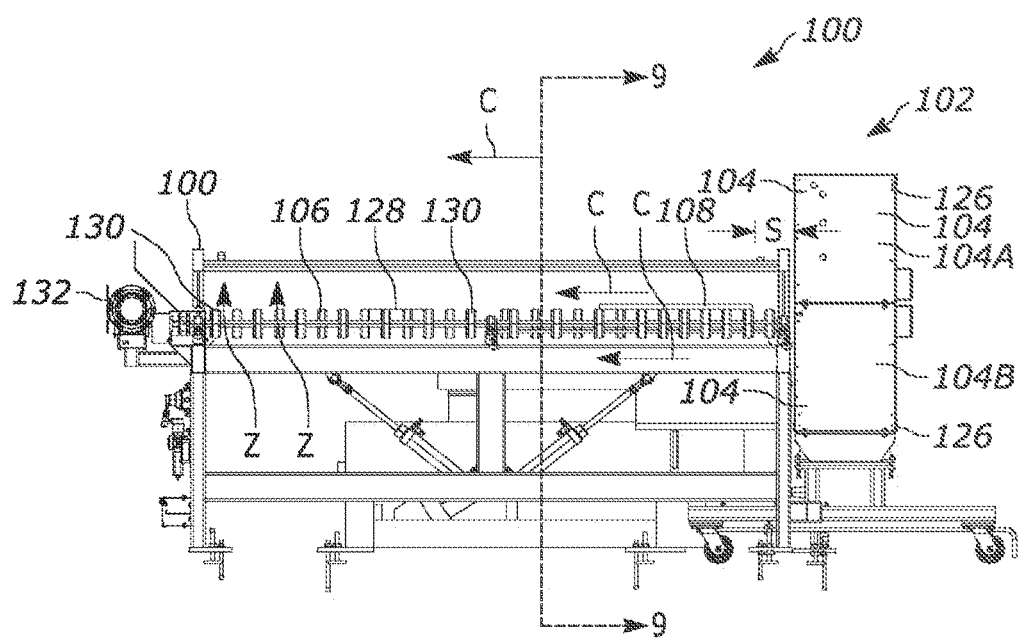
FIG. 8 is a partial elevated side view of an IGU cooling assembly constructed in accordance with one example embodiment of the present disclosure.
Figure 8A:
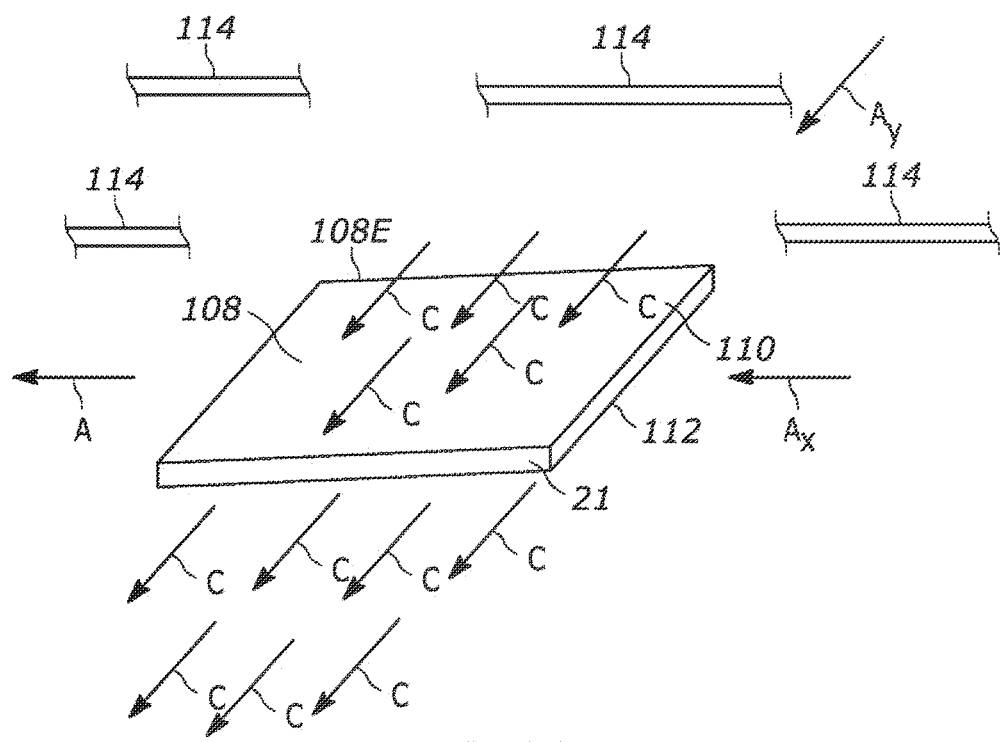
FIG. 8A illustrates the IGU 14 traveling in the direction of the conveyor A about an axis of travel Ax in which planar surfaces of the lites 18 and 22 forming the IGU 14 are substantially parallel to the direction of the cooling fluid flow illustrated by arrows C along about a flow axis Ay transverse to the axis of travel Ax in accordance with one example embodiment of the present disclosure.

FIG. 8A illustrates the IGU 14, 108 traveling in the direction of the conveyor 106 about an axis of travel Ax in which planar surfaces of the lites 110 and 112 forming the IGU 14, 108 are substantially parallel to both the direction of the cooling fluid flow illustrated by arrows C about a flow axis Ay transverse to the axis of travel Ax in accordance with one example embodiment of the present disclosure. The cooling assembly includes a plurality of cooling units 104 that direct air (C) at the IGU and the conveyor as illustrated in FIGS. 8, 8A and 9.

In one example embodiment, the cooling assembly 100 comprises a plurality of cooling units 104 extending along the conveyor 106 as illustrated in FIG. 5. The cooling units 104 are extended side-by-side and/or assembly over-and-under each other and/or any combination thereof, as illustrated in FIG. 5. The over unit 104A and under unit 104B include a front side 124 from which the air is expelled toward the conveyor and a rear side 126. While six different cooling units 104 are shown in FIG. 5, it should be appreciated by those skilled in the art that any number of units could be used without departing from the spirit and scope of the present disclosure. In the illustrated example embodiment FIG. 8, the IGU 14, 108 is spaced a distance "S" from the front 124 of the cooling units 10, 100. In one example embodiment, the distance "S" is two (2") inches, but could be closer to the front 124 or away from the front depending on the cooling requirements.

Figure 9:
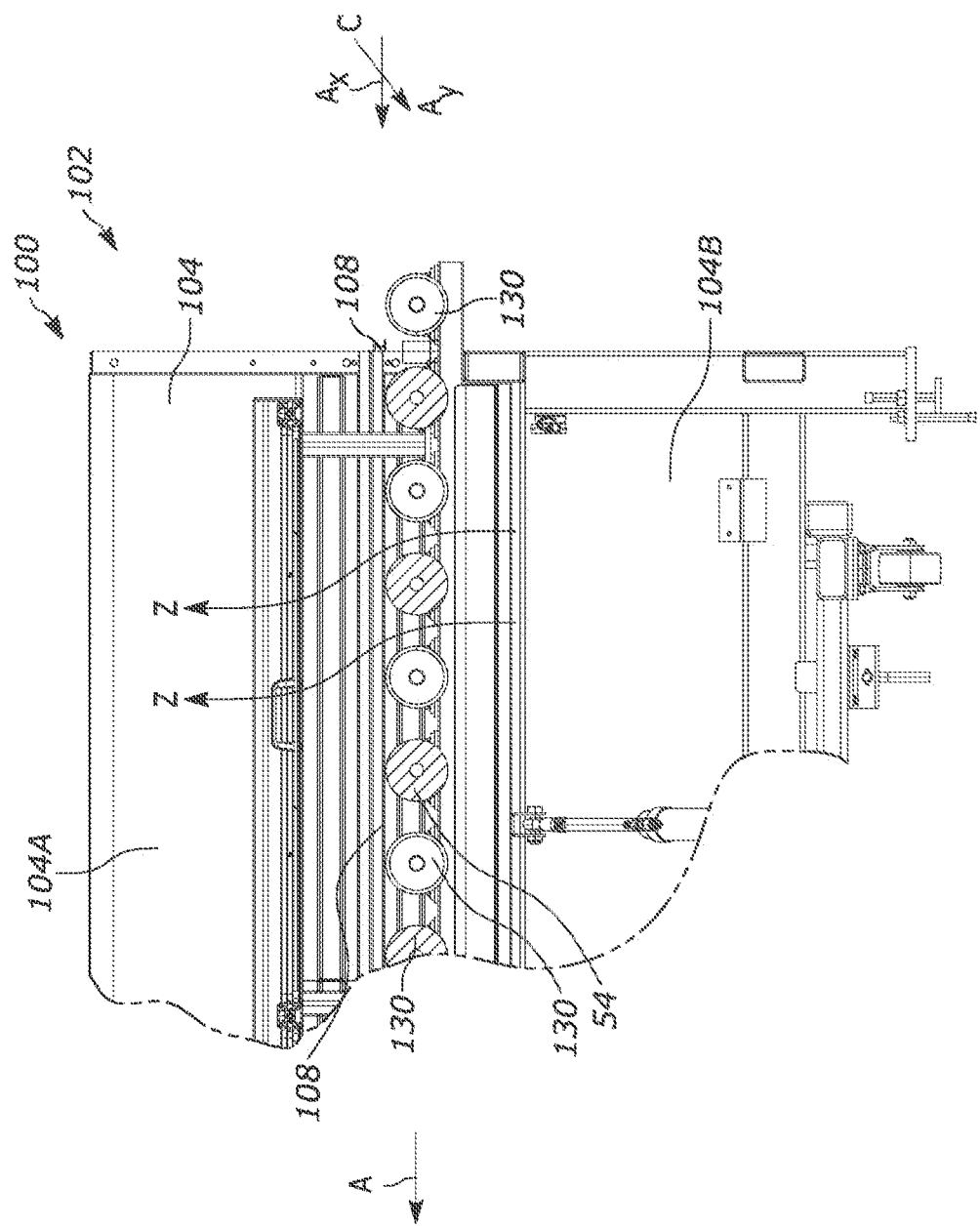
FIG. 9 is a section view of FIG. 8 along section lines 8-8.
Figure 10:
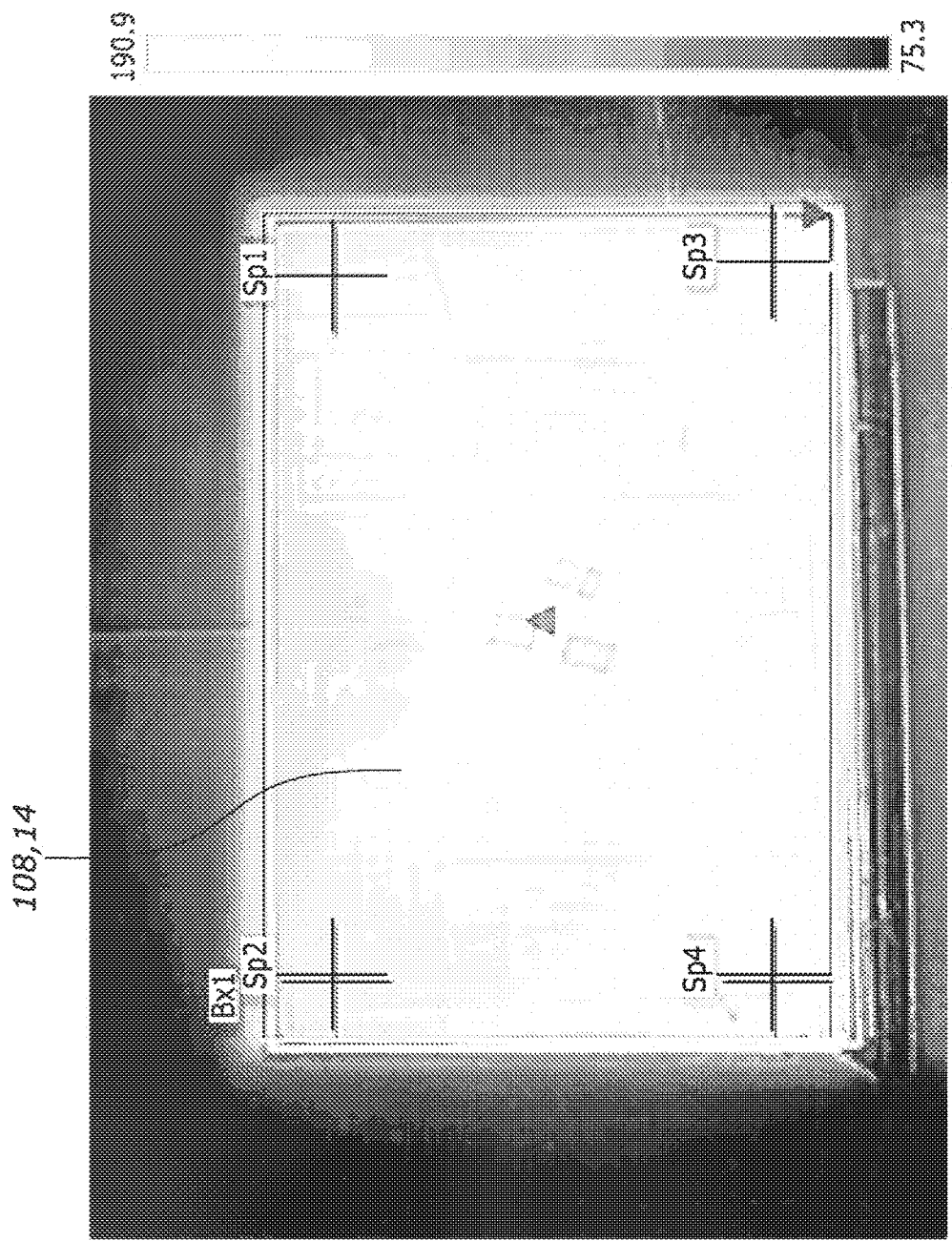
FIG. 10 is a thermal image of an IGU after exiting a press oven.
Figure 11:
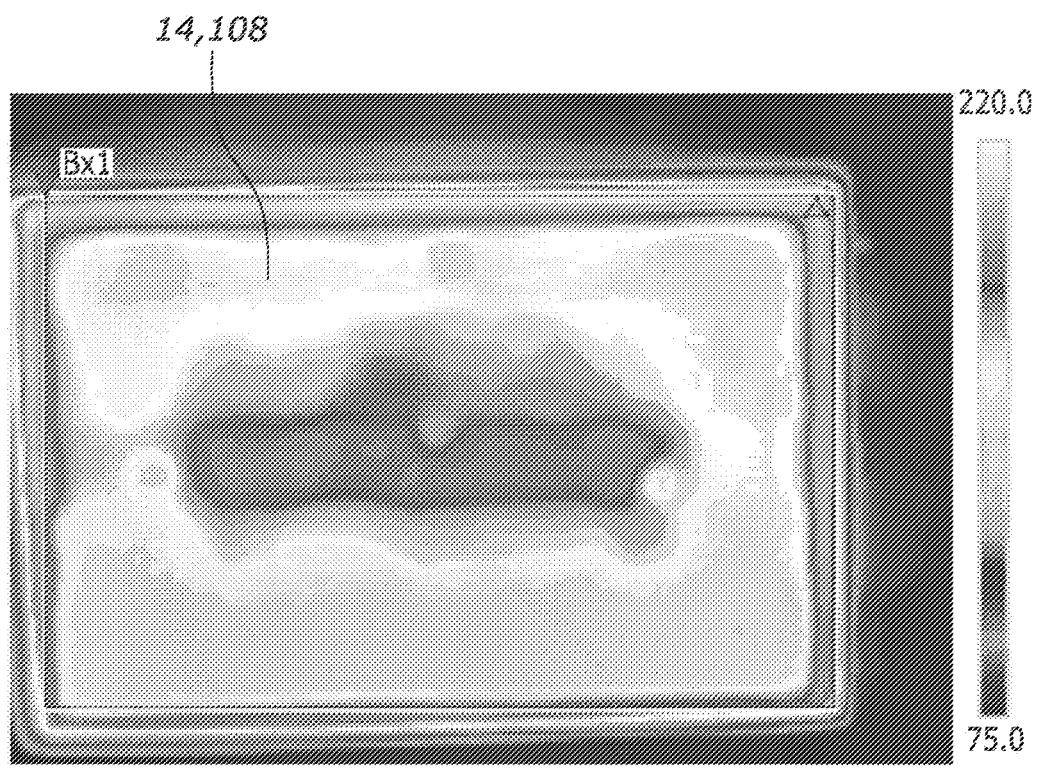
FIG. 11 is a thermal image of an IGU after exiting a press oven for a duration of time without an IGU cooling assembly.

As can be seen in the example embodiment of FIGS. 8 and 9, the conveyor 106 has a planar surface 128 that is parallel with and for supporting the planar glass surfaces 110 and 112 of the insulating glass units 14, 108. In the illustrated example embodiment, the conveyor 106 is semi-permeable with a plurality of spaces z to allow for cooling and the air/fluid flow through the conveyor from units 104 to the bottom planar surface 110 or 112 of the IGU 14, 108. In the exemplary embodiment of FIGS. 8 and 9, the conveyor 106 comprises a plurality of rollers 130 in which one or more rollers are powered by a motor and gearbox combination 132 as instructed by controller 50 as would be appreciated by one of ordinary skill in the art.

In an alternative example embodiment, the conveyor 106 is a belt having semi-permeable spaces z to allow for cooling to the underside plane 110 or 112 of the IGU 14, 108. While in one example embodiment, the upper cooling units 104A direct air to the upper glass planar surface 110 or 112 of the IGU 14, 108 and the lower cooling units 104B direct air to the lower planar surface 110 or 112 of the IGU 14, 108, it should be appreciated that laminar air flow C expelled from the either upper or lower units can become turbulent upon engaging the conveyor and thus cool both the upper and lower planes of the IGUs while remaining substantially parallel in flow with the planar surfaces of the IGUs upon exiting the unit 104, contacting the IGU 14, 108, and passing over the IGU 14, 108.

In one example embodiment, the cooling units 104 are refrigerated by performing a refrigeration cycle to provide conditioned air C to cool the IGUs 14, 108. In another example embodiment, the cooling units 104 are constructed to direct flow, similar to an air knife to provide concentrated air. In yet another example, the cooling units 104 provide a combination of concentrated and conditioned air C. While in another example embodiment, the cooling units 104 comprise one or more fans to move ambient air C to cool the IGUs 14, 108.

Figure 13:
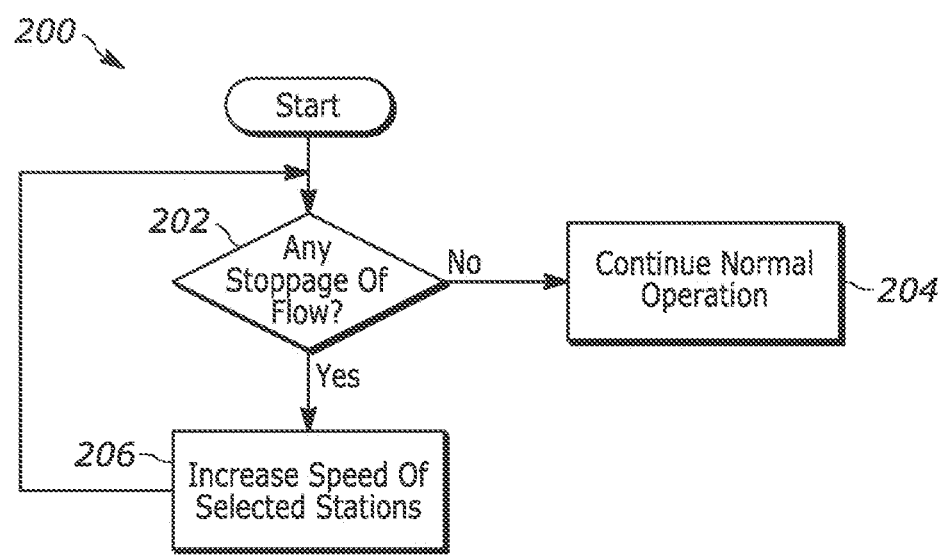
FIG. 13 is a process flow diagram illustrating a method of operating an IGU cooling assembly in accordance with one example embodiment of the present disclosure.

Referring now to FIG. 13 is a process flow diagram illustrating a method 200 of operating an IGU cooling assembly 10, 100 in accordance with one example embodiment of the present disclosure. The method 200 starts by providing a network of sensors and/or computers 39, 50 in communication with an oven/press assembly 12, cooling assembly 10, 100, upright station 13 and final sealing station 15. At 202, the computers and/sensors 39, 50 communicate to a central computer 50A of any stoppage in the flow of the IGU assembly operation as it passes through stations 10, 12, 13, and 15 as illustrated in FIG. 5. If the determination at 202 is negative, at 204 the stations continue to flow at a constant throughput rate of speed. If the determination at 202 is positive, at 206 one or more stations may independently increase speed in order to accommodate IGUs being processed in the oven/press assembly 12.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%.

The term "coupled" as used herein is defined as connected or in contact either temporarily or permanently, although not necessarily directly and not necessarily mechanically. A device or structure that is "configured" in a certain way is configured in at least that way, but may also be configured in ways that are not listed. The term "integral" as used herein unless defined otherwise means configured in such a way that separation would require destruction to the parts or the assembly of the parts.

It should be appreciated by those of ordinary skill in the art after having the opportunity of reviewing the drawings and/or specification of the present disclosure that may include one or more embodiments, e.g., $E_1, E_2, \ldots E_n$ and that each embodiment E may have multiple parts $A_1, B_1, C_1 \ldots Z_n$ that (without further description) could be combined with other embodiments $E_n$ parts or lack of parts originally associated with one or all embodiments, or any combination of parts and embodiments thereof. It should further be appreciated that an embodiment may include only one part or a lesser number of parts of any embodiment or combination of embodiments that was described or shown in the specification and/or drawings, respectively without further description than what was disclosed in the original embodiment or combination of embodiments.

To the extent that the materials for any of the foregoing embodiments or components thereof are not specified, it is to be appreciated that suitable materials would be known by one of ordinary skill in the art for the intended purposes after having the benefit of reviewing the subject disclosure and accompanying drawings.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An insulating glass unit cooling assembly comprising:
   a cooling unit that directs air at insulating glass units;
   a conveyor that transports insulating glass units along a path of travel defining an axis of travel for the insulating glass units;
   the conveyor having a conveyor planar surface supporting a corresponding planar glass surface of the insulating glass units as the insulating glass units are conveyed along the axis of travel such that the planar surface of the insulating glass units is substantially horizontal and substantially parallel to said conveyor planar surface; and
   said air from said cooling unit is directed in a path substantially parallel with said conveyor planar surface and the planar glass surface of the insulating glass units as the insulating glass units travel along said conveyor.

2. The insulating glass unit cooling assembly of claim 1 wherein said directed air of said cooling unit is conditioned air.

3. The insulating glass unit cooling assembly of claim 2 wherein said directed air of said cooling unit is concentrated air.

4. The insulating glass unit cooling assembly of claim 1 wherein said directed air of said cooling unit is concentrated air.

5. The insulating glass unit cooling assembly of claim 1 wherein said cooling unit comprises a plurality of cooling units.

6. The insulating glass unit cooling assembly of claim 5 wherein said plurality of cooling units comprise first and second cooling units directing respective first and second air paths at the insulating glass units as the insulating glass units move along said axis of travel on said conveyor.

7. The insulating glass unit cooling assembly of claim 6 wherein said first air path is directed parallel to a first planar glass surface of the insulating glass unit and said second air path is directed parallel a second planar glass surface of the insulating glass unit as the insulating glass unit travels along said conveyor.

8. The insulating glass unit cooling assembly of claim 7 wherein said conveyor is a semi-permeable track to allow for the directing of said first air path at a first planar glass surface of the insulating glass unit and said second air path is directed at a second planar glass surface through the semi-permeable surface of said conveyor at the insulating glass unit as the insulating glass unit travels along said conveyor.

9. The insulating glass unit cooling assembly of claim 1 wherein said conveyor is a semi-permeable track to allow for the directing of said air at insulating glass units traveling along said axis of travel.

10. The insulating glass unit cooling assembly of claim 1, wherein the cooling unit comprises at least one air curtain.

11. An insulating glass unit cooling assembly system comprising:
    a cooling unit that directs air at insulating glass units, the insulating glass units having at least one or more glass lites;
    a conveyor that transports insulating glass units along a path of travel defining an axis of travel for the insulating glass units, the conveyer having a planar surface supporting the corresponding planar surface of the at least one or more glass lites of the insulating glass units during use; and
    said air from said cooling unit is directed in a path substantially parallel with said conveyor planar surface; and
    an upright unit wherein insulating glass units are rotated as the insulating glass units exit said conveyor so that a planar surface formed by at least one or more glass lites is substantially perpendicular with said planar surface of said conveyor.

12. The insulating glass unit cooling assembly system of claim 11, wherein the insulating glass units are rotated at an angle between 85 and 95 degrees as insulating glass units transition from said conveyor to said upright unit.

13. The insulating glass unit cooling assembly system of claim 11, wherein the insulating glass unit cooling assembly further comprises a control system in communication with said assembly.

14. The insulating glass unit cooling assembly system of claim 13, wherein the control system comprises at least one computer.

15. The insulating glass unit cooling assembly system of claim 11, wherein the upright unit comprises a plurality of rollers.

16. The insulating glass unit cooling assembly system of claim 11, wherein the upright unit comprises a conveyor belt comprising semi-permeable spaces.

17. A method of cooling an insulating glass unit comprising the steps of:
    providing a cooling assembly having at least one cooling unit;
    directing air at insulating glass units with said at least one cooling unit;
    transporting insulating glass units on a conveyor along a path of travel defining an axis of travel for the insulating glass units;

providing said conveyor having a planar surface supporting a corresponding planar glass surface of the insulating glass units as the insulating glass units are conveyed along the axis of travel such that the planar surface of the insulating glass units is substantially parallel to said planar surface of said conveyor; and directing said air from said at least one cooling unit in a direct path substantially parallel with said conveyor planar surface and the planar glass surface of the insulating glass units as the insulating glass units travel along said conveyor during operation.

18. The method of cooling the insulating glass unit of claim 17, the method further comprising the step of providing first and second cooling units wherein said first cooling unit is positioned above said second cooling unit such that during operation cooling air from said first cooling unit is substantially directed above said planar surface of said conveyor and said cooling air from said second cooling unit is substantially directed below said planar surface of said conveyor.

19. The method of cooling the insulating glass unit of claim 17, the method further comprising the step of coupling the cooling assembly with an upright unit.

20. The method of cooling the insulating glass unit of claim 17, the method further comprising the step of coupling the cooling assembly with a sealing unit.

\* \* \* \* \*